United States Patent [19]

Barker et al.

[11] Patent Number: 4,757,414

[45] Date of Patent: Jul. 12, 1988

[54] PROTECTIVE DEVICES FOR ELECTRICAL EQUIPMENT AND COMPONENTS

[75] Inventors: Peter Barker, Peartree Cottage; Stephen E. Hunt, Romsey, both of England

[73] Assignee: RIC Limited, Hampshire, England

[21] Appl. No.: 892,752

[22] Filed: Jul. 31, 1986

[51] Int. Cl.⁴ .............................................. H01G 1/11
[52] U.S. Cl. ...................................... 361/15; 361/272
[58] Field of Search ................................ 361/15–17, 361/272–275

[56] References Cited

U.S. PATENT DOCUMENTS

| | | | |
|---|---|---|---|
| 4,059,848 | 11/1977 | Kort et al. | 361/274 X |
| 4,586,107 | 4/1986 | Price | 361/272 |
| 4,633,365 | 12/1986 | Stockman | 361/272 |
| 4,639,827 | 1/1987 | Strange et al. | 361/272 |
| 4,639,828 | 1/1987 | Strange et al. | 361/272 |

FOREIGN PATENT DOCUMENTS

| | | |
|---|---|---|
| 2436442 | 2/1976 | Fed. Rep. of Germany . |
| 1087636 | 10/1967 | United Kingdom . |
| 1441507 | 7/1976 | United Kingdom . |
| 1463322 | 2/1977 | United Kingdom . |
| 1539194 | 1/1979 | United Kingdom . |
| 1592706 | 7/1981 | United Kingdom . |
| 2070861 | 6/1984 | United Kingdom . |

Primary Examiner—J. R. Scott
Assistant Examiner—Jeffrey A. Gaffin
Attorney, Agent, or Firm—Fitch, Even, Tabin & Flannery

[57] ABSTRACT

A capacitor is composed of an external casing with an internal polyurethane encapsulation containing a polypropylene layered metallized film type capacitor element. Inside the casing is a component in the form of a frangible substrate having at least one conductive track thereon. The track establishes connection between a terminal on the casing and the capacitor element. The substrate is either mounted directly to the inside of the casing or is contained in a cartridge. The substrate is of brittle nature and distorts should pressure increase in the casing to shatter to break the track and isolate the terminal from the capacitor element.

13 Claims, 4 Drawing Sheets

PROTECTIVE DEVICES FOR ELECTRICAL EQUIPMENT AND COMPONENTS

FIELD OF THE INVENTION

The present invention relates in general to protective devices for use with electrical equipment and components.

BACKGROUND TO THE INVENTION

It is known to employ a pressure-sensitive interrupter device as a cover on a capacitor. Such a device then serves to break electrical connection should the interior of a can housing the capacitor be subjected to excessive pressure. UK patent specification No. 1592706 describes a known form of such a device. UK patent specification No. 1441507 also describes a capacitor in which a cut-out device responds to deformation of the capacitor element itself in the event of a rise in internal pressure.

SUMMARY OF THE INVENTION

According to one aspect of the present invention, there is provided a device for interrupting an electrically conductive path between a terminal and an electrical component e.g. a capacitor element. The device comprises a frangible substrate mounted within a casing containing the component or within a separate cartridge in said casing for at least direct partial movement with the casing or cartridge. The frangible substrate carries a track which defines part of at least one electrical conductor for connecting the terminal to the component. On increased pressure in the casing, means transfers resulting physical deformation of the casing itself or of the cartridge to the frangible substrate to cause it to self-destruct thereby to interrupt said conductor.

In the context of the specific application mentioned above, the electrical component is a capacitor element. The casing may then have two terminals and the track on the frangible substrate would connect by way of a flexible lead within the casing to one of these terminals. The conductor would also be connected with the capacitor element which itself is joined directly to the other terminal.

The present invention also provides a capacitor comprising a casing containing at least one capacitor element and having external terminal means and a pressure sensitive interrupter composed of at least one frangible substrate carrying an electrical conductive track which connects the capacitor element to the terminal means. The substrate is mounted to the casing to move at least partially therewith or is mounted inside a cartridge for at least partial movement therewith. Means then subjects the frangible substrate to destructive forces in response to increased pressure in the casing to break the conductive track to disconnect the terminal means from the capacitor element. The capacitor element itself can be moulded into polyurethane resin within the casing and the cartridge with the substrate means can be sealed with resin.

The frangible substrate can be a thin plate or board made of ceramic on which is deposited at least one conductive layer forming the conductive track which is interrupted when the substrate destructs. The substrate can be fixed to an inside surface of the casing such as to a base wall. In an alternative arrangement the substrate is mounted inside the aforementioned cartridge which is designated to deform and break the conductor. A ceramic substrate as used for thick film integrated circuits is found to be suitable and tends to shatter reliably should the casing or cartridge be deformed by internal pressure. Where the substrate is mounted to the casing as by lugs or the like the casing tends to deform outwards if pressure increases and this in turn produces flexure or shear force on the substrate to cause its physical destruction. With the cartridge relative movement between component parts of the cartridge can reliably break the conductor by shattering the substrate.

The invention may be understood more readily, and various other aspects and features of the invention may become apparent, from consideration of the following description.

BRIEF DESCRIPTION OF DRAWINGS

Embodiments of the invention will now be described, by way of example only, with reference to the accompanying drawings, wherein.

DESCRIPTION OF PREFERRED EMBODIMENTS

Figure 1:
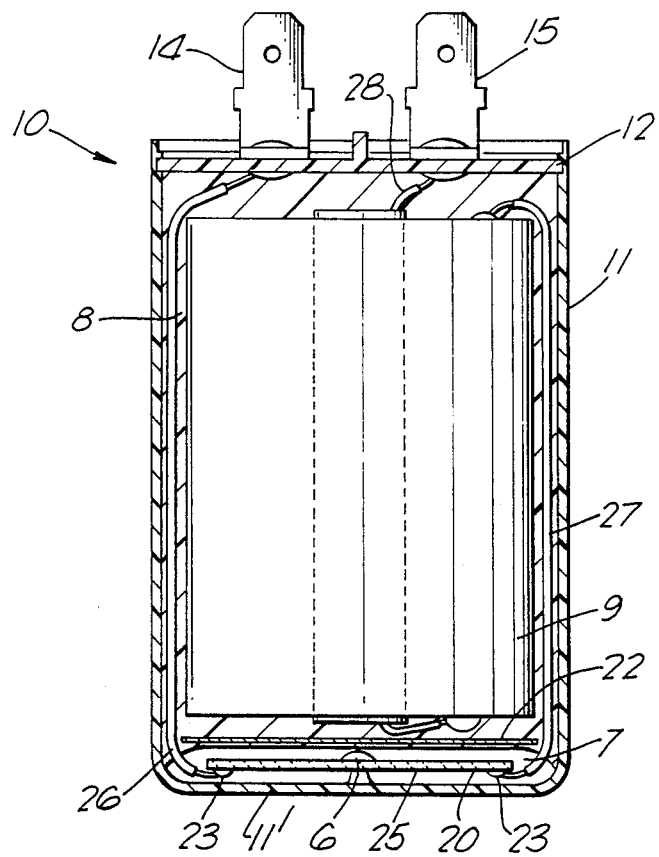
FIG. 1 is a sectional side view of a capacitor constructed in accordance with the invention.
Figure 4:
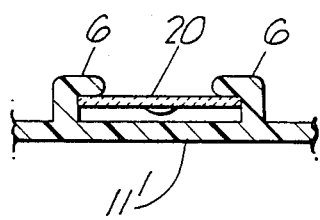
FIG. 4 is a section taken along the line IV—IV of FIG. 2.
Figure 5:
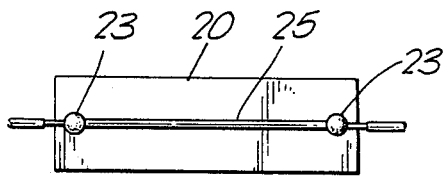
FIG. 5 is a plan view of the conductor plate component of the capacitor shown in FIGS. 1 to 4.
Figure 2:
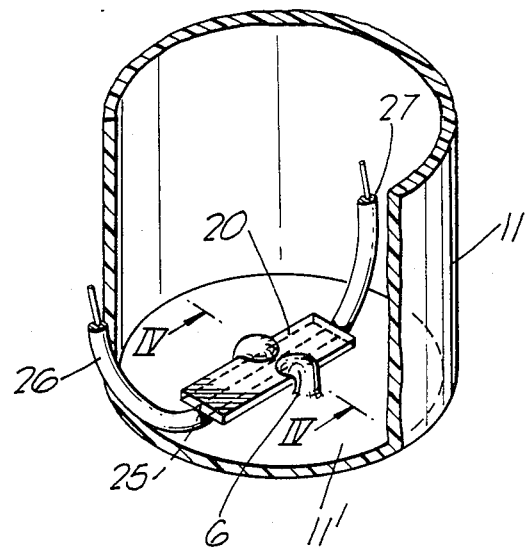
FIG. 2 is a perspective view of the base region of the casing of the capacitor shown in FIG. 1 and depicting the conductive plate component fitted thereto.

As shown in FIG. 1, a capacitor 10 is composed of a cylindrical casing 11 made from a synthetic plastic material, e.g. a thermoplastic polyester such as "Arnite" or a thermoplastic resin such as "Noryl" to which a separately-formed cover 12 is fitted. The cover has a pair of terminals 14, 15. The container 11 contains a capacitor element 9 made up of layers of metallized polypropylene film encapsulated within a moulded-in internal housing 8 made from a polyurethane resin. The housing 8 is conveniently produced by the so-called "resin fill and invert method" known per se. A cavity or chamber 7 is disposed between the base of the internal housing 8 and the base wall 11' of the casing 11. An insulated sheet 22, made from a thin cardboard, extends over the lower face of the housing 8 and is embedded therein. A conductor plate 20 is provided within the cavity 7 and is conveniently held to the base of the case 11 with the aid of moulded retention lugs 6 as shown in FIGS. 2 and 4. As shown in FIG. 5 the component 20, which is a substrate made from a brittle, frangible material, such as ceramic, has deposited onto it a conductive track 25 leading between connectors 23 in the form of soldered pads. The conductive track 25 is on the side of the substrate facing the base wall 11' of the casing 11. A flexible lead 26 joins one of the connectors 23 to the terminal 14 and another flexible lead 27 joins the other connector 23 to the capacitor element 9. Another lead 28 connects the terminal 15 to the capacitor element 9. Thus there is a series (a.c.) path from the terminal 14 through the conductor 25 and the capacitor element 9 back to the terminal 15. As shown, the leads are conveniently moulded-in with the internal housing 8 to form a compact supported structure.

Figure 3:
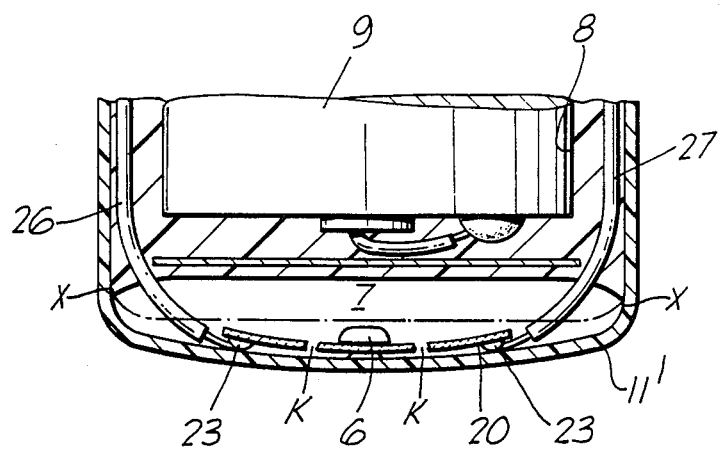
FIG. 3 is a sectional side view of the base region of the capacitor shown in FIGS. 1 and 2 depicting the situation where the casing is deformed by internal pressure.

During operation, should a fault occur leading to an increase in pressure in the casing 11, the base wall 11' of the latter becomes deformed as is known and bows outwards as shown in FIG. 3 where the line X—X denotes the normal undeformed state of the wall 11'. The plate 20 is caused to undergo the same distortion but the stress on the plate 20 actually causes the substrate to break and the conductive track 25 is consequently interrupted as denoted simplisticly in FIG. 3 by reference "K". The effect of the breakage is to isolate the terminal 14 from the capacitor element 9.

Figure 6:
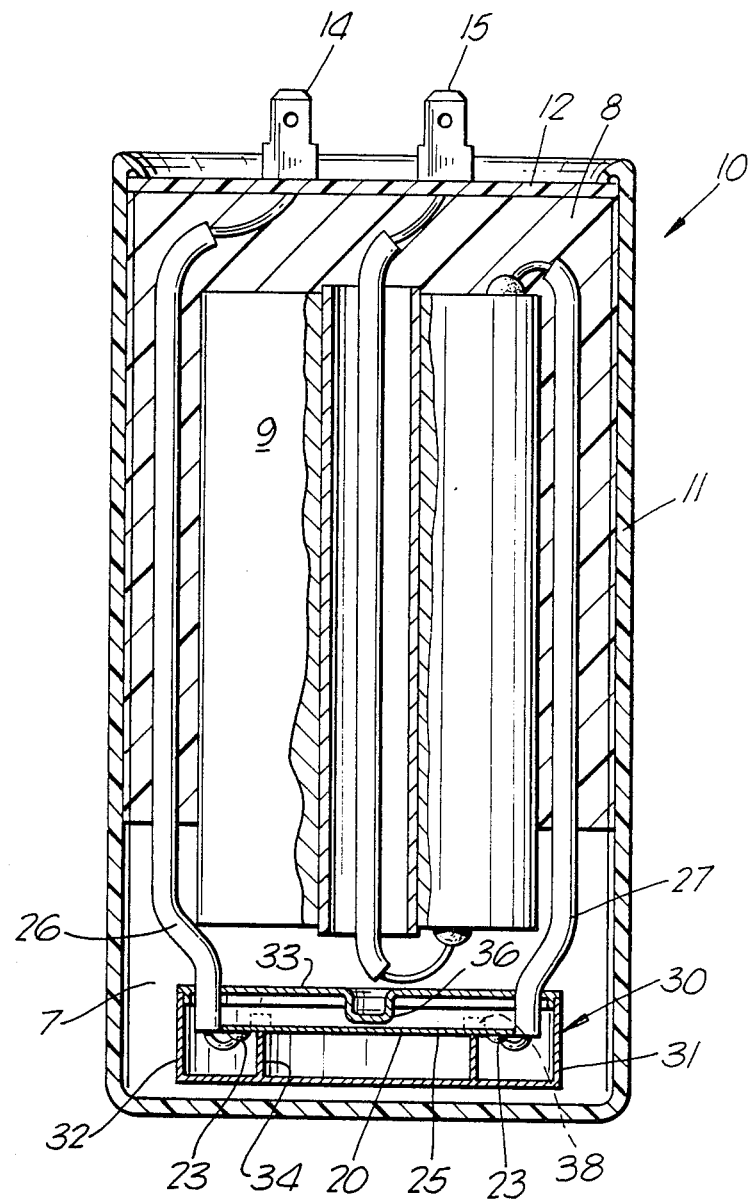
FIG. 6 is a sectional side view of another capacitor constructed in accordance with the invention.
Figure 7:
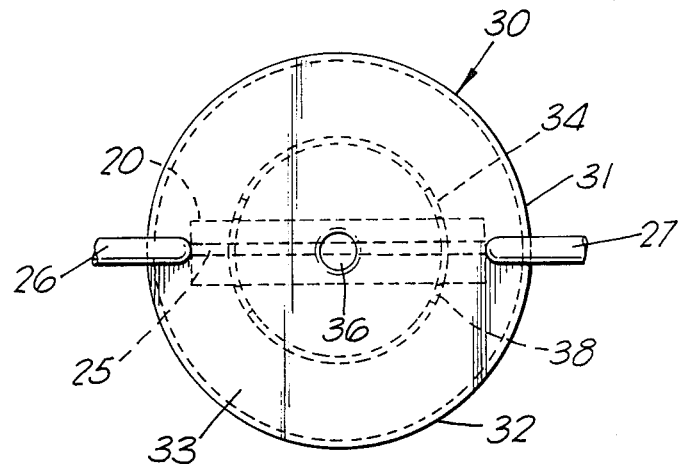
FIG. 7 is a plan view of the cartridge used in the capacitor shown in FIG. 6.
Figure 8:
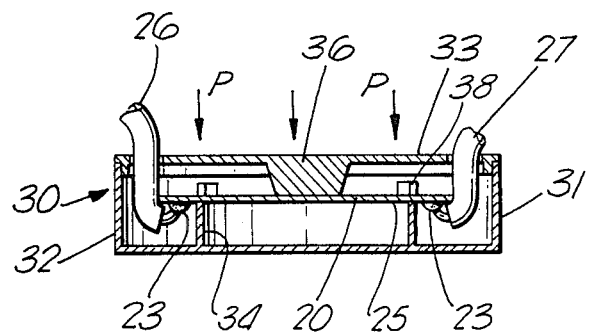
FIG. 8 is a sectional side view of a modified form of cartridge usable in the capacitor shown in FIG. 6.
Figure 9:
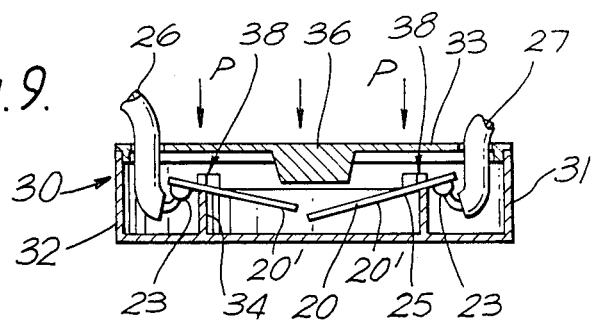
FIG. 9 is a sectional side view of the cartridge shown in FIG. 8 after the conductive plate has been broken.
Figure 10:
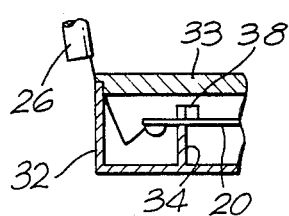
FIG. 10 is a scrap view showing another modification to the cartridge.

FIGS. 6 to 10 depict other constructions where like reference numerals denote like parts to those described previously in connection with FIGS. 1 to 5. In these constructions the conductive plate 20 is mounted within a flexible cartridge 30 itself positioned in the cavity 7. The cartridge 30 can take the form depicted in FIG. 6 or 8, i.e. a two-part annular assembly. The cartridge 30 thus has a main body 31 with an exterior rim 32 connected as, for example, by a press-fit to a cover or cap 33. The body 31 has a supportive inner wall 34 on which the plate 20 rests. The wall 34 has upstanding lugs 38 or the like which engage on the sides of the plate 20 as a press-fit as shown in FIG. 7. The cap 33 has an inner projection 36 conveniently at its center which rests on the conductive plate 20 (FIG. 8) or is spaced therefrom (FIG. 6). The leads 26, 27 pass through bores into the cap 33 or, as shown in FIG. 10, under the edge of the cap 33. In contrast to the first embodiment, deformation of the cartridge 30 itself is designed to shatter the plate 20 to break the track 25 rather than the base 11' of the casing 11. Thus, as represented by arrows P in FIG. 8, an increase in internal pressure in the casing 11 acts on the cap 33 and causes the projection 36 to act as a fulcrum to press on and deform the central region of the plate 20 surrounded by the wall 34 until the plate 20 shatters as represented in FIG. 9. When the plate 20 has been fractured the lugs 38 still grip the sides of the portions 20' of the plate 20 and this ensures the fractured portions 20' are held apart to preclude arcing between severed regions of the track 25. A suitable material for the cartridge 30 or for at least the cap 33 thereof is polypropylene or more preferably nylon.

The construction shown in FIGS. 6 to 10 can be used with capacitors with casings of plastic or aluminum and no modification of the capacitor itself is necessary. Capacitor elements of metallized polypropylene film tend to release hydrogen under fault conditions which can create an explosion hazard if arcing occurs within the capacitor casing. However if the interior of the cartridge 30 is sealed, by pre-dipping the cartridge 30 in resin and the interior of the casing 11 is subjected to the resin fill and invert treatment to create the internal housing 8 as previously mentioned, gas leakage is prevented and the breaking of the conductive track 25, which can of itself cause arcing, cannot cause difficulties.

We claim:

1. In a capacitor comprising a casing, a capacitor element mounted within the casing, terminal means mounted on the exterior of the casing, conductors within the casing establishing electrical connection between the terminal means and the capacitor element, and a pressure-sensitive interrupter breaking the electrical connection between the terminal means and the capacitor element and isolating the terminal means from the capacitor element in the event of excess pressure in the casing; the improvement comprising, the interrupter including a frangible, non-conductive substrate having thereon a conductive track forming part of one of the conductors and means locating and holding the substrate relative to the interior of the casing for at least partial direct movement with the casing to cause the substrate to be subjected to destructive force if the casing undergoes physical deformation in response to excess pressure within the casing.

2. A capacitor according to claim 1, wherein the locating means mounts the substrate to the inside of a base wall of the casing.

3. A capacitor according to claim 1, wherein the substrate is made from a ceramic material.

4. A capacitor according to claim 1, wherein the capacitor element is formed of metallized polypropylene film encapsulated within a polyurethane resin moulding inside the casing.

5. In a capacitor comprising a casing, a capacitor element mounted within the casing, terminal means mounted on the exterior of the casing, conductors within the casing establishing electrical connection between the terminal means and the capacitor element, and a pressure-sensitive interrupter breaking the electrical connection between the terminal means and the capacitor element and isolating the terminal means from the capacitor element in the event of excess pressure in the casing; the improvement comprising, the interrupter including a cartridge within the casing and a frangible, non-conductive substrate within the cartridge for at least partial direct movement with the cartridge, the substrate being provided with a conductive track forming part of one of the conductors and the cartridge being provided with means which subjects the substrate to destructive force if the cartridge undergoes physical deformation in response to excess pressure within the casing.

6. A capacitor according to claim 5, wherein the cartridge has two component parts, one of said parts being provided with means supporting the substrate and the other of said parts being provided with projecting means acting to exert destructive force on the substrate in response to the deformation of the cartridge.

7. A capacitor according to claim 5, wherein the substrate is made from a ceramic material.

8. A capacitor according to claim 5, wherein the cartridge has a supportive wall engaging the substrate and an opposed projection bearing on a region of the substrate not supported by the wall to subject the substrate to the destructive force.

9. A capacitor according to claim 8, wherein the supportive wall is provided with lugs which engage as a press-fit with opposed edges of the substrate.

10. A capacitor according to claim 5, wherein the capacitor element is formed of metallized polypropylene film encapsulated within a polyurethane resin moulding inside the casing.

11. A capacitor according to claim 5, wherein the cartridge is sealed by pre-dipping the cartridge in resin.

12. A capacitor according to claim 5, wherein the cartridge is provided with internal lug means gripping the substrate to preclude arcing between severed portions of the conductive track after destruction of the substrate.

13. In a capacitor comprising a casing, a capacitor element mounted within the casing, terminal means mounted on the exterior of the casing, conductors within the casing establishing electrical connection between the terminal means and the capacitor element, and a pressure-sensitive interrupter breaking the electrical connection between the terminal means and the capacitor element and isolating the terminal means from the capacitor element in the event of excess pressure in the casing; the improvement comprising, the interrupter including a cartridge within the casing and conductive means within the cartridge which forms part of one of the conductors and which breaks said electrical connection if the cartridge undergoes physical deformation in response to excess pressure within the casing.

* * * * *